United States Patent [19]
Oki

[11] Patent Number: 5,625,618
[45] Date of Patent: Apr. 29, 1997

[54] OPTICAL RECORDING MEDIUM EMPLOYING AN INTERMITTENT PATTERN FOR GUIDING TRACKS AND TRACKING APPARATUS FOR THE SAME

[75] Inventor: Hiroshi Oki, Yokohama, Japan

[73] Assignee: Nikon Corporation, Tokyo, Japan

[21] Appl. No.: 282,264

[22] Filed: Jul. 29, 1994

[30] Foreign Application Priority Data

Jul. 30, 1993 [JP] Japan ................... 5-206858

[51] Int. Cl.$^6$ ............................................. G11B 7/24
[52] U.S. Cl. .................. 369/275.1; 369/275.3; 369/279
[58] Field of Search .................. 369/275.3, 275.1, 369/278, 279, 58, 44.37, 277, 44.38, 44.34, 44.35

[56] References Cited

U.S. PATENT DOCUMENTS

| | | | |
|---|---|---|---|
| 4,707,733 | 11/1987 | Shinyagaito et al. | 369/32 |
| 4,754,339 | 6/1988 | Nagai et al. | 369/275.3 |
| 4,797,870 | 1/1989 | Nagai et al. | 369/112 |
| 4,802,159 | 1/1989 | Nagai et al. | 369/275.3 |
| 4,803,677 | 2/1989 | Yamaguchi et al. | 369/275.3 |
| 4,864,423 | 9/1989 | Nagai et al. | 369/47 |
| 4,949,331 | 8/1990 | Maeda et al. | 369/275.3 |
| 5,084,860 | 1/1992 | Maeda et al. | 369/275.3 |

FOREIGN PATENT DOCUMENTS 62-134833 6/1987 Japan .................. 369/275.3

*Primary Examiner*—Georgia Y. Epps
*Assistant Examiner*—Tan Dinh
*Attorney, Agent, or Firm*—Keck, Mahin & Cate

[57] ABSTRACT

An optical recording medium has a track format with a track pitch smaller than a diffraction limit of a light spot so as to realize an increased capacity and a higher density. A guide groove for tracking purposes is formed along each of the concentrically or spirally formed tracks in a periodic intermittent pattern with respect to a circumferential direction of the optical recording medium. The intermittent patterns of the guide grooves adjoining each other with respect to a radial direction of the optical recording medium are displaced in phase from each other. A light spot of a diameter greater than the track width is projected onto the optical recording medium in rotation and the position of the light spot is servo-controlled in the track width direction in such a manner that a light quantity distribution with respect to the track width direction of a reflected or transmitted light of the light spot diffracted by the selected guide groove maintains its symmetry in the track width direction.

13 Claims, 4 Drawing Sheets

# OPTICAL RECORDING MEDIUM EMPLOYING AN INTERMITTENT PATTERN FOR GUIDING TRACKS AND TRACKING APPARATUS FOR THE SAME

BACKGROUND OF THE INVENTION

1. Field of the Invention

The present invention relates to an optical recording medium and a tracking apparatus adapted for the same.

2. Description of Related Art

Accompanying the recent progress toward higher performance and personalization in the field of information apparatus such as computers, communication equipment and video equipment, the amount of information to be processed has been ever increasing and there has existed an extremely high demand for large increase in the density and capacity of a medium for recording information. In these circumstances, the system of reading the recorded information from the medium by an optical method will be considered to constitute the most powerful technique even in the future.

Presently, as the so-called optical recording media of the type adapted for the reading of recorded information by such optical method, a musical compact disc (CD), laser disc (LD), CD-ROM or magneto-optical disc capable of higher density recording of information has, for example, been put in practical use and is coming into wide use.

Such an optical recording medium or rotating disc has a track format in which tracks are formed concentrically or spirally in the circumferential direction and pits, each consisting of a recording unit of information, are recorded in the form of patterns along the tracks.

When reading the information recorded along the tracks, the light from a light source, e.g., a semiconductor laser is focused into a tiny spot of light through an optical head and projected onto the disc so that the variations in the amount of reflected light or transmitted light or the variations in the plane of polarization in the case of the magneto-optical disc are detected to generate time sequence signals corresponding to the presence and absence of the pits.

By reducing the spot size of the light beam focused on the tracks up to about the diffraction limit determined by its wavelength, it is permitted to reduce the size of the recording unit (pit) of information to substantially the spot size and thereby to realize a higher recording density.

On the other hand, when reading the information from such optical recording medium, during the rotation of the disc the light spot must be caused to accurately follow the fine pitch of the tracks, that is, the tracking control must be effected. In order to optically discriminate for this purpose the tracks adjoining in the radial direction of the disc from each other, the concentric or spiral tracking guides, which are generally called guide grooves, are continuously formed along the tracks to provide the reflected light or transmitted light of the light spot with an inherent optical characteristic. In this case, in a typical example, an examination of the disc cross-sectional construction in the direction crossing the tracks shows that the stepped structures formed by the guide grooves and the intervening land portions determine the track pitch P and hence the track width.

On the other hand, another construction in which the tracking guides are discontinuously formed along the tracks is also made known by for example the composite track servo system adapted to compensate an offset caused in a tracking error signal due to the inclination of the disc, and in this case the intermittent patterns of the tracking guides are formed in such a manner that the tracks adjoining with respect to the radial direction of the disc coincide in the phase of the intermittent patterns with each other.

The tracking control is accomplished by the tracking servo technique so that the focused tiny light spot is projected on the guide groove of the optical recording medium from the semiconductor laser through the optical head and the variation in the light quantity of the resulting reflected light or transmitted light or the diffraction pattern is photoelectrically detected, thereby servo-controlling the position of the objective lens of the optical head so as to prevent deviation of the light spot from the track. Where the tracking guides are in the intermittent patterns, the sampling method is utilized for the detection of tracking error signals.

The tracking servo techniques are roughly divided into two known methods. One is a method employing a single light spot and in this case the tracking error detecting method used is the well known push-pull method, the heterodyne method or the like The other method is a so-called three beam method employing three light spots arranged in a direction which is slightly inclined relative to the track lengthwise direction. In this case, the light beam from the semiconductor laser is separated by a diffraction grating into a main beam or the zero-order beam and two sub beams or the ± first-order beams. The main beam produces a recording/playback main beam on the optical recording medium and two tracking sub spots are produced by the sub beams so as to interpose the main spot therebetween.

Also, recently there has been proposed a super resolution optical recording/playback system which utilizes the optical or thermal nonlinear characteristics of an optical recording medium, that is, a system capable of reading the information recorded with a pit size which is less than the diffraction limit of a light beam.

Then, the conventional optical recording media are disadvantageous in that due to the necessity for the previously mentioned tracking control utilizing the diffraction phenomenon of the light beam, it is impossible to make the track width or the track pitch less than the diffraction limit of the light beam used for recording and/or playback purposes.

In other words, if the track width is decreased, the track pitch determined by the arrangement spacing of the guide grooves is also inevitably decreased, whereas if the track pitch P is made less than the diffraction limit $P_c$ of the light beam ($P_c=\lambda/2NA$: $\lambda$ is the wavelength of the light and NA is the numerical aperture of the objective lens of the optical head), irrespective of the position in which the light spot is placed relative to the guide groove, the light quantity of the reflected light returning to the objective lens of the optical head is no longer varied and it is no longer possible to generate a tracking error signal from the optical head.

In this case, in order to positively detect photoelectrically the backward light quantity corresponding to the position of the light spot relative to the guide groove, the difference between the track pitch P and the diffraction limit $P_c$ of the light spot must be sufficient, and therefore it has been necessary in the past to select the track pitch P to be sufficiently large as compared with the diffraction limit $P_c$ for the purpose of obtaining fully reliable tracking error signals thus restricting the lower limit of the track pitch and thereby preventing increase in the density of optical recording media. Moreover, these deficiencies are similarly encountered in the case of the super resolution optical recording/playback system which utilizes the optical or thermal nonlinear characteristics of optical recording media.

SUMMARY OF THE INVENTION

It is the primary object of the present invention to provide an optical recording medium having a track format which ensures an increase in its recording density and recording capacity.

It is another object of the present invention to provide an optical recording medium and a tracking apparatus therefor whereby the tracking control can be effected by use of the existing tracking error detecting techniques even if the track pitch is made less than the diffraction limit of the light beam used for recording and/or playback purposes.

In accordance with an aspect of the present invention there is thus provided an optical recording medium having a concentrical or spiral track format to be tracked by a light spot, and the optical recording medium includes a plurality of concentric or spiral guide lines which are each adapted to define the width of the track for each circle of the track format and provide the reflected light or transmitted light of the light spot with an inherent optical characteristic and having an intermittent pattern such that, for each circle, a guide line existing portion and a guide line nonexistent portion appear periodically with respect to the circumferential direction in which the track extends and the guide lines adjoining each other with respect to the radial direction of the optical recording medium are displaced in the phase of the intermittent pattern from each other.

In accordance with another aspect of the present invention, the optical recording medium is such that in at least part of its area formed with the tracks the pitch of the tracks adjoining each other with respect to the radial direction of the optical recording medium has a dimension which is less than the diffraction limit determined by the wavelength of the light producing the light spot.

In accordance with still another aspect of the present invention, the optical recording medium is such that each of the guide line existing portions extends along the track lengthwise direction with a dimension corresponding to substantially 1/n (n is an integer) of the period of the intermittent pattern, that each of the guide line nonexistent portions extends along the track lengthwise direction with a dimension corresponding to substantially (n−1)/n of the period of the intermittent pattern, that the phase displacement corresponds to substantially 1/n of the period of the intermittent patterns, that each of the guide line nonexistent portions in the intermittent pattern forms a wide region which is integral with the adjoining tracks on its sides, and that each of the wide regions has a width dimension which is substantially greater than n times the track width with respect to the track width direction.

Further, in accordance with the present invention, there is provided a tracking apparatus for positioning the light spot to the desired track during the rotation of the optical recording medium. The tracking apparatus includes a photoelectric detector whereby the light spot of a diameter greater than the track width is projected onto the rotating optical recording medium and the light quantity distribution with respect to the track width direction of the reflected light or transmitted light of the light spot diffracted by the guide line existing portion is detected in the far field, and a control unit for servo-controlling the light spot in the track width direction so as to cause the detected light quantity distribution to maintain its symmetry in the track width direction.

With a tracking apparatus according to a preferred aspect of the present invention, the light spot is a single light spot whereby the spot center is aligned with the guide line to effect the on-groove recording or the on-groove playback.

In this case, the tracking apparatus can further include means for providing a tracking signal for the servo control with an offset amount such that the center position of the light spot is maintained at a position which is displaced from the guide line by substantially ½ of the track width in the track width direction. If the tracking signal is provided with an offset amount in this way, it is possible to effect the on-land recording or the on-land playback by the light spot by aligning the spot center with a position displaced from the guide line in the track width direction.

In accordance with another preferred aspect of the present invention, the tracking apparatus includes three such light spots arranged in an oblique direction relative to the tracks whereby the central light spot of the three light spots is a main spot for information recording or playback purposes and the end light spots of the three light spots are first and second sub spots for tracking purposes, with each of the first and second sub spots being spaced apart from the main spot by a distance of substantially less than ½ of the track width with respect to the track width direction.

For instance, assuming a case in which the track pitch determined by the radial pitch of the guide grooves is reduced to ½ of the heretofore adopted lower limit with a view to increasing the recording density of information, in the case of the conventional recording medium the spacing between the adjoining guide grooves becomes less than the diffraction limit of the light spot and it is impossible to obtain a tracking error signal.

On the other hand, in the optical recording medium having the guide lines formed according to the present invention, each of the guide line nonexistent portions within each intermittent pattern forms a wide region which is integral with the adjoining tracks on its sides so that in this wide region the spacing between the guide lines with respect to the track width direction becomes greater than the diffraction limit of the light spot, thus making it possible to produce a fully reliable tracking error signal in this wide region.

While there are cases where the tracking control of the optical recording medium according to the present invention produces tracking error signals intermittently, a tracking control by such intermittent tracking error signals can be realized by the use of the well known sampling method.

Thus, in accordance with the present invention the tracking control can be performed even if the track pitch is reduced to a fraction of that in the conventional optical recording medium and therefore it is possible to perform the recording of information with much higher density than previously.

The above and other objects, features and advantages of the present invention will become more apparent from the following description of its preferred embodiments shown simply for purposes of illustration without any intention of limitation when taken in conjunction with the accompanying drawings.

DESCRIPTION OF THE PREFERRED EMBODIMENTS

Figure 1:
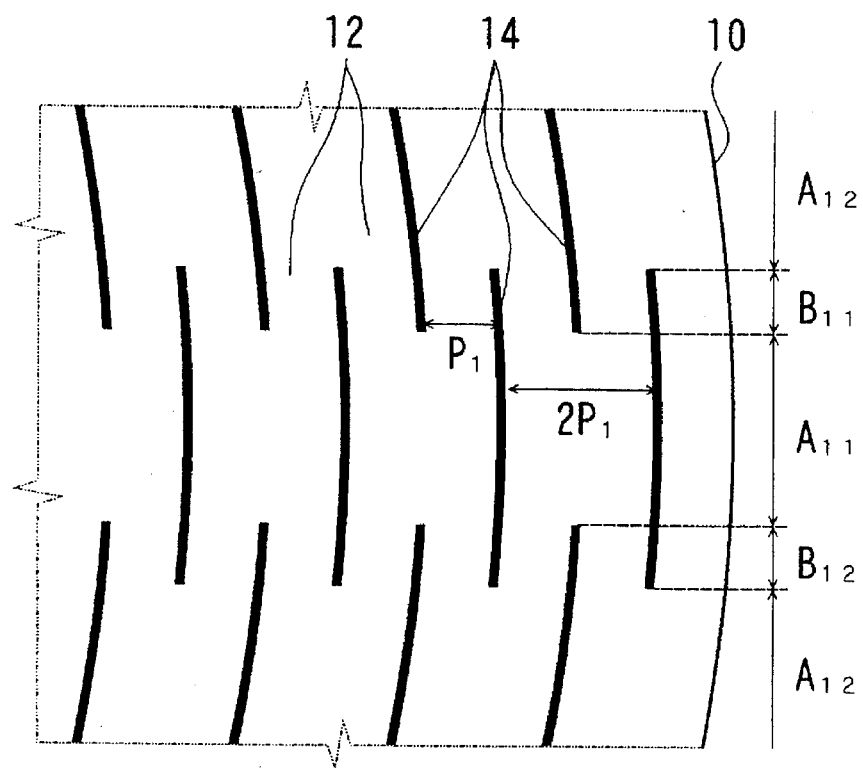
FIG. 1 is a schematic diagram showing in enlarged form a principal part of a track format of an optical recording medium according to one embodiment of the present invention.

Referring to FIG. 1, there is illustrated in enlarged form the track format for a part of an optical disc according to an embodiment of the present invention. In the Figure, a disc 10 has a spiral (or concentric) track format to be traced by a light spot, and the width of a track 12 for each circle of the track format and hence a track pitch $P_1$ is defined by concentric or spiral guide grooves 14 which provide the reflected or transmitted light of the light spot with an inherent optical characteristic which is different from that of the track 12 portions for the tracking by the light spot.

The guide grooves 14 are formed along the tracks 12 in the disc surface. Also, considering with respect to each circle, the guide line 14 is in an intermittent pattern in which a guide groove existing portion (a portion described by a thick solid line) and a guide groove nonexistent portion (the discontinuous portion of the thick solid line) appear periodically with respect to the disc circumferential direction (the vertical direction in the plane of the paper in FIG. 1) in which the track 12 extends, and an examination of the guide grooves adjoining each other with respect to the radial direction of the optical disc 10 (the lateral direction in the plane of the paper in FIG. 1) shows that the phases of the intermittent patterns are displaced from each other. Due to this phase displacement, in sector regions $B_{11}$ and $B_{12}$ where the adjoining guide grooves overlap each other in the disc radial direction the spacing between the guide grooves is equal to the track pitch $P_1$, whereas in sector regions $A_{11}$ and $A_{12}$ each corresponding to the wide region formed by the guide groove nonexistent portion the spacing between the guide grooves is equal to two times the track pitch or $2P_1$.

Thus, even if the track pitch $P_1$ is selected to be ½ (=0.8 μm) of 1.6 μm which has been the ordinary track pitch dimension in the past, the spacing between the guide grooves becomes the same as previously or 1.6 μm in the regions $A_{11}$ and $A_{12}$ and therefore it is possible to obtain the required photoelectric signals for the detection of tracking errors in all the same manner as previously in these sector regions $A_{11}$ and $A_{12}$.

It is to be noted that in this case the guide grooves are not circumferentially continuous so that tracking error signals cannot necessarily be obtained at all times during the rotation of the disc, although this is dependent on the number and arrangement of light spots. However, to effect the tracking control by utilizing such intermittent tracking error signals is fully possible by the hitherto well known sampling servo system which performs the servo control in those sections where tracking error signals are obtainable and which locks the servo control in the other sections where tracking error signals are interrupted.

Figure 2:
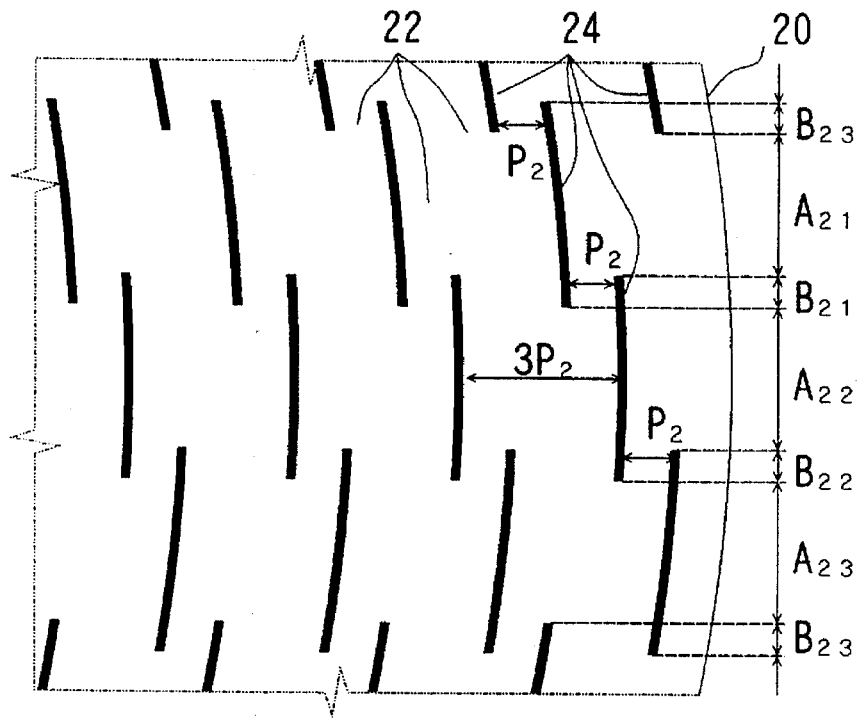
FIG. 2 is a schematic diagram showing in enlarged form a principal part of a track format of an optical recording medium according to another embodiment of the present invention.

Referring now to FIG. 2, there is illustrated in enlarged form the track format of an optical disc according to another embodiment of the present invention with respect to a part thereof. In the Figure, a disc 20 has a spiral (or concentric) track format to be traced by a light spot and the width of a track 22 for each circle of the track format and hence a track pitch $P_2$ is defined by a concentric or spiral guide groove 24 which provides the reflected or transmitted light of the light spot with an inherent optical characteristic which is different from that of the track 22 portion for the purpose of the tracking by the light spot.

The guide grooves 24 are formed along the tracks 22 in the disc surface. When examining with respect to each circle, each of the guide lines 24 has an intermittent pattern in which a guide groove existing portion (that portion described by a thick solid portion) and a guide groove nonexistent portion (the discontinuous portion of the thick solid line) appear periodically in the disc circumferential direction (the vertical direction in the plane of the paper in FIG. 2) in which the track 22 extends, and an examination of the guide grooves adjoining each other with respect to the radial direction of the optical disc 20 (the lateral direction in the plane of the paper in FIG. 2) shows that the phases of the intermittent patterns are displaced from each other. As the result of this phase displacement, the spacing between the guide grooves is equal to the track pitch $P_2$ in sector regions $B_{21}$, $B_{22}$ and $B_{23}$ where the adjoining guide grooves overlap each other in the disc radial direction, whereas the spacing between the guide grooves is equal to three times the track pitch or $3P_2$ in sector regions $A_{21}$, $A_{22}$ and $A_{23}$ each corresponding to the wide region formed by the guide groove nonexistent portion.

Therefore, even if the track pitch P2 is selected to be ⅓ (≈0.53 μm) of 1.6 μm which has heretofore been the ordinary track pitch dimension, the spacing between the guide grooves becomes the same as the conventional spacing of 1.6 μm in the regions $A_{21}$, $A_{22}$ and $A_{23}$ so that in each of these sector regions $A_{21}$, $A_{22}$ and $A_{23}$ it is possible to obtain a photoelectric signal for the detection of a tracking error in all the same manner as previously.

It is to be noted that similarly it is possible to use a track format such that in each sector region corresponding to the wide region formed by the guide groove nonexistent portion the spacing between the guide grooves becomes more than four or five times the track pitch thereby further increasing the recording density of the disc.

Generally, each of the guide line existing portions extends along the track lengthwise direction with a dimension which is substantially 1/n (n is an integer) of the period of the intermittent pattern with respect to the disc circumferential direction and each of the guide line nonexistent portions extends along the track lengthwise direction with a dimension correpsonding to substantially (n−1)/n of the period of the intermittent pattern whereby the previously mentioned phase displacement corresponds to substantially 1/n of the period of the intermittent pattern; each of the guide line nonexistent portions within the intermittent pattern forms a wide region which is integral with the adjoining tracks on its sides, and this wide region has a width dimension of greater than substantially n times the track width with respect to the track width direction.

Figure 3:
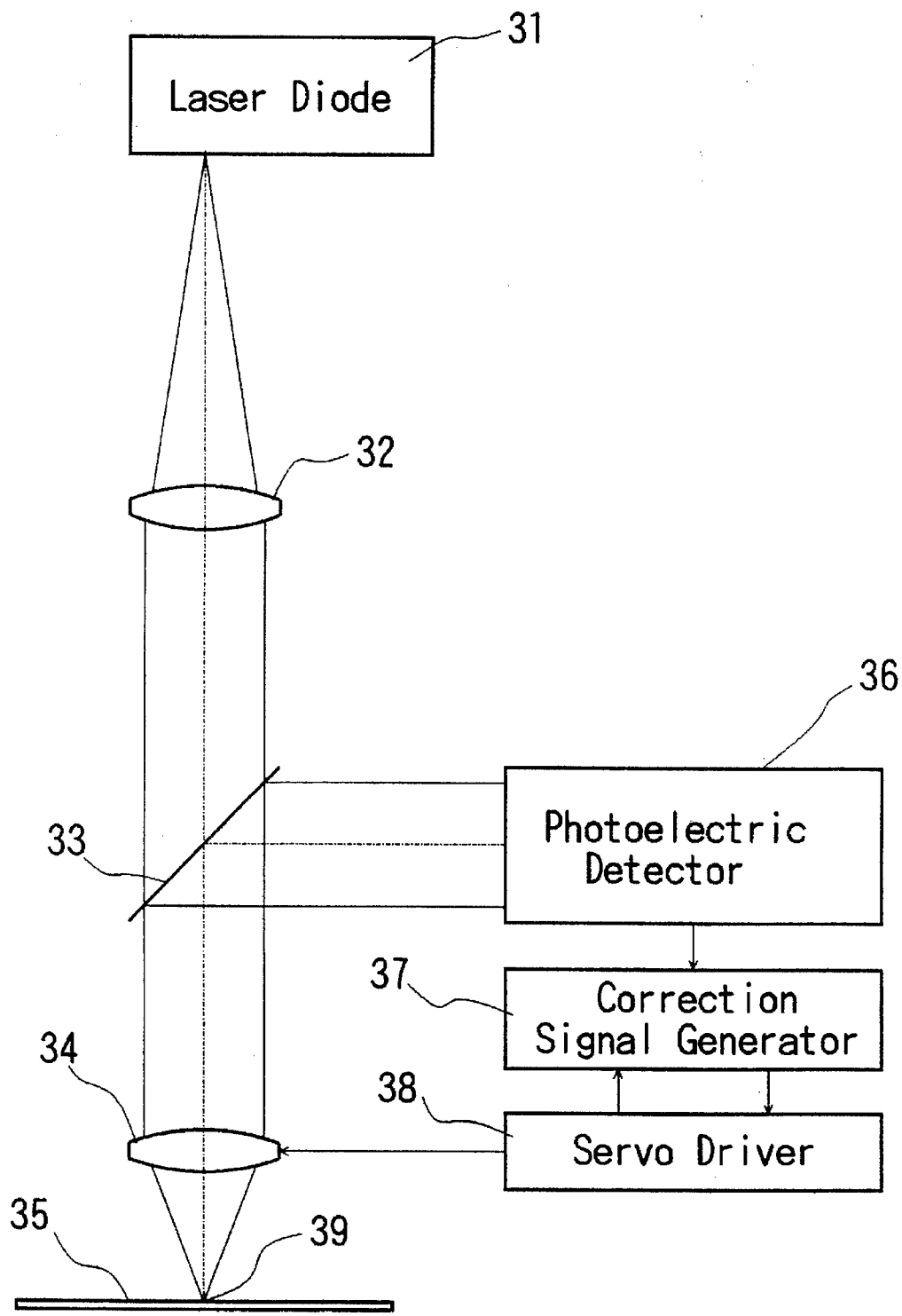
FIG. 3 is a block diagram showing schematically the construction of a tracking apparatus according to still another embodiment of the present invention.

Referring now to FIG. 3, there is illustrated a block diagram showing the construction of a principal part of a tracking apparatus adapted for use with optical recording media having the track formats according to the present invention. This tracking apparatus is adapted for positioning a light spot 39 to the desired track of an optical disc 35 during its rotation.

In FIG. 3, the laser beam emitted from a semiconductor laser light source 31 is converted to a collimated light beam by a collimator lens 32 so that the collimated light beam is transmitted through a half mirror 33 to fall on an objective lens 34 and the light beam is focused by the objective lens 34 thereby forming the tiny light spot 39 on the rotating optical disc 35.

As described in connection with FIG. 2 (or FIG. 3), the objective lens 34 forms on the disc surface the light spot 39 of a diameter greater than the width dimension, i.e., the track pitch $P_1$ (or $P_2$) of the tracks 12 (or 22) formed in the optical disc.

Produced from the light spot 39 on the disc surface is a reflected light diffracted by the guide groove existing portion of the guide groove 14 (or 24) so that the reflected light is again returned to the objective lens 34 and converted to a collimated light beam which in turn is reflected by the half mirror 33 to fall on a photoelectric detector 36.

The photoelectric detector 36 includes a bisplit sensor for detecting in the far field the light quantity distribution with respect to the track width direction of the reflected light of the light spot 39 diffracted by the guide line existing portion, so that the section of the incident collimated light beam is divided into two parts and are respectively converted to electric signals thereby detecting the light quantity distribution with respect to the track width direction within the section of the incident light beam in accordance with the received light intensities of the bisplit sensor. As the result of the detection of such light quantity distribution, a tracking error signal including information concerning the relative positional relation between the guide groove 14 (or 24) and the light spot 39 with respect to the track width direction is generated from the photoelectric detector 36. It is to be noted that this type of photoelectric detector may be comprised of one having the same construction as the well known bisplit photodetector used in the tracking error detecting system according to the so-called push-pull method.

The tracking error signal generated from the photoelectric detector 36 is applied to a tracking correction signal generator 37 and the signal generator 37 generates a servo signal (tracking signal) for tracking correcting puposes.

Where the optical disc 35 has the track format described in connection with FIG. 1, as mentioned previously, the generation of tracking error signals is limited to the sector regions $A_{11}$ and $A_{12}$ and moreover these sector regions $A_{11}$ and $A_{12}$ are different in tracking error signal amplitude and waveform from each other. Thus, the signal generator 37 which receives the tracking error signals must generate the relevant tracking signals in correspondence to the respective sections $A_{11}$ and $A_{12}$ as well as the sections $B_{11}$ and $B_{12}$ and the well known sample-and-hold circuit can be utilized for the production of tracking signals by the use of such intermittent signals. It is to be noted that the same applies to the case where the optical disc 35 has the track format explained in connection with FIG. 2.

The tracking signal generated from the signal generator 37 is supplied to a servo driver 38 for moving the position of the objective lens 34 in the track width direction and, on the other hand, a position feedback signal of the objective lens 39 is fed back to the signal generator 37 from the servo driver 38. The tracking servo control of the light spot 39 is effected by this servo loop so that the position of the light spot is controlled in the track width direction in such a manner that the light quantity distribution detected by the photoelectric detector 36 maintains its symmetry in the track width direction.

Figure 4:
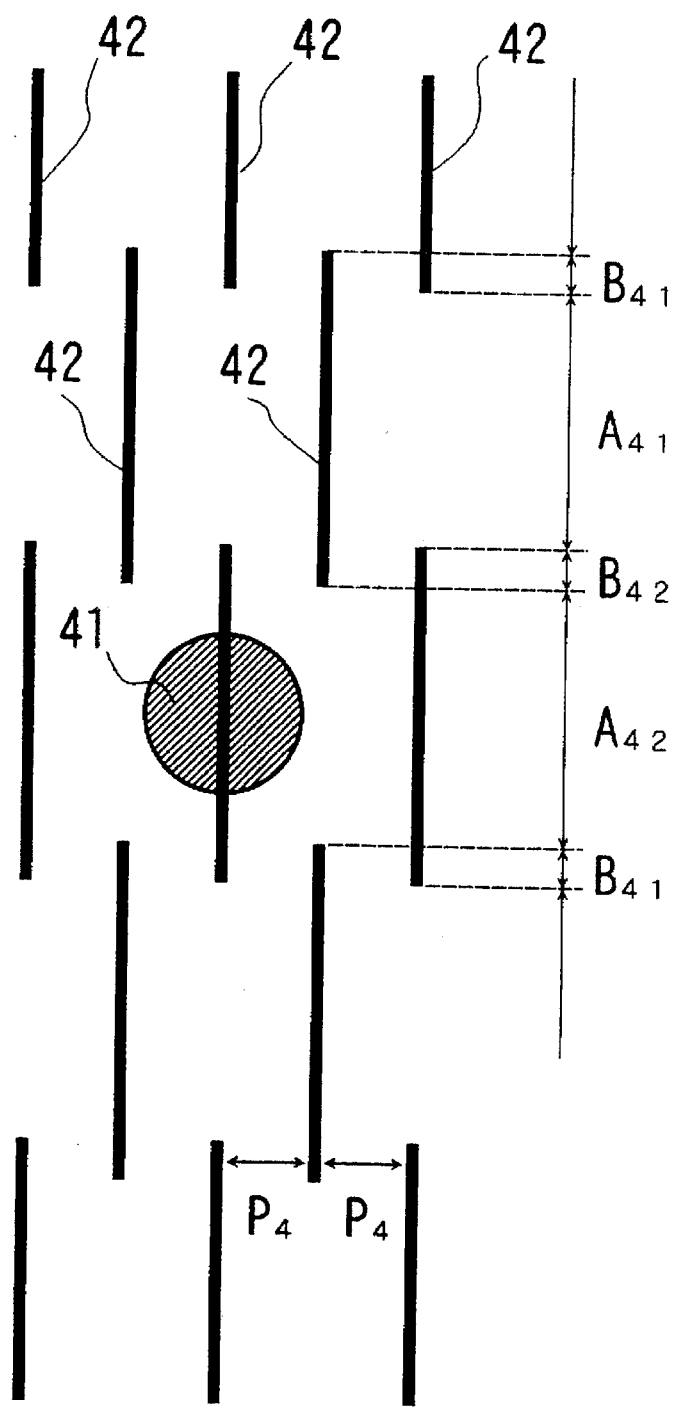
FIG. 4 is a schematic diagram for explaining the outline of a tracking operation in said one embodiment of the present embodiment.

FIG. 4 shows the state of a light spot on an optical disc in a case where the optical disc having the track format as shown in FIG. 1 is subjected to tracking control by the tracking apparatus of FIG. 3. The embodiment shown in FIG. 4 shows the case where guide grooves 42 formed with a track pitch $P_4$ on a disc 40 are traced by a light spot 41 to effect the desired on-groove recording/playback.

In this case, tracking error signals are intermittent signals produced in sector regions $A_{41}$ and $A_{42}$ so that in each of sector regions $B_{41}$ and $B_{42}$ where no tracking error signal is generated the immediately preceding tracking error signal must be subjected to a sample-and-hold operation. Also, since the guide groove 42 is discontinuous as mentioned previously, the playback signal of the recorded information is also subjected to modulations due to the discontinuity of the guide groove. In order to minimize the degree of modulation in this case, the depth of the guide groove 42 should preferably be as shallow as possible.

Then, with the embodiment of FIG. 4, it is a matter of course that by adding an offset corresponding to substantially ½ of the track width to each tracking signal or by projecting some sub spots for groove tracing purposes in addition to the recording/playback light spot, the on-land recording/playback can also be effected.

Figure 5:
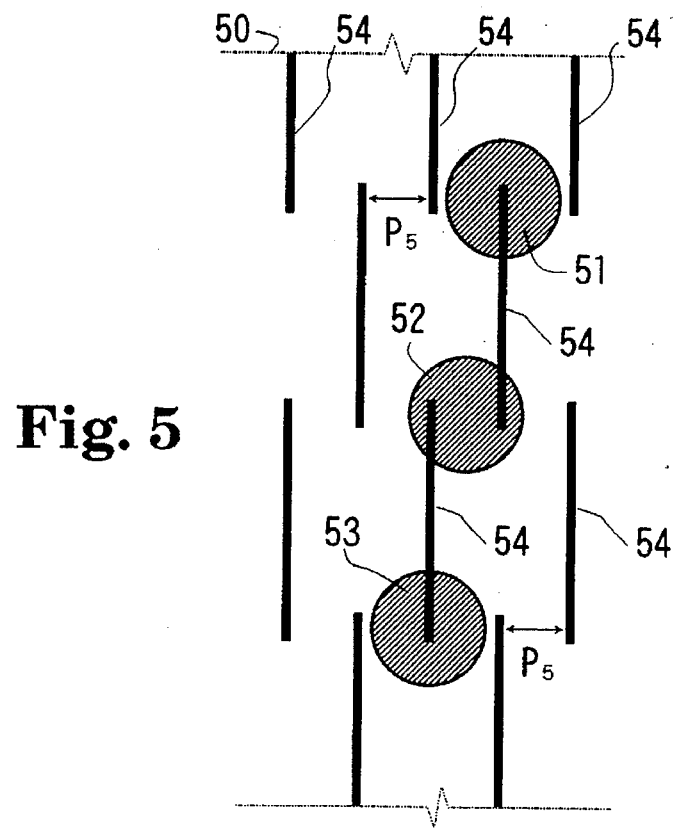
FIG. 5 is a schematic diagram for explaining the outline of a tracking operation in said another embodiment of the present invention.
Figure 6:
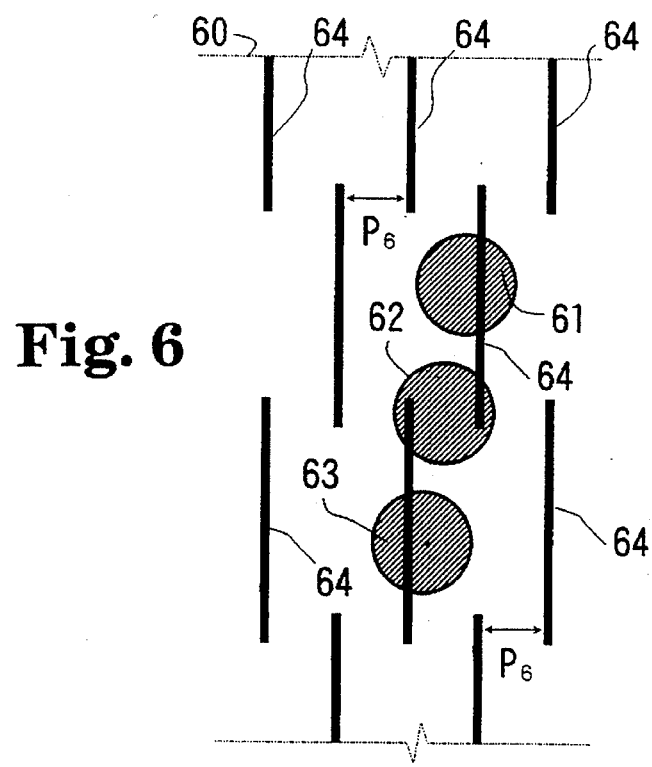
FIG. 6 is a schematic diagram for explaining the outline of a tracking operation in said still another embodiment of the present invention.

FIGS. 5 and 6 each shows the manner of arranging light spots in the case of effecting the on-land recording/playback by the three-beam system. In any of these cases, tracking sub spots are projected on the both sides of a central recording/playback main spot. The method of producing such three light spots by means of the beam from a common semiconductor laser light source is well known as previously mentioned.

In FIG. 5, guide grooves 54 of an intermittent pattern are formed with a track pitch $P_5$ on a disc 50 in the like manner as in the embodiment shown in FIG. 1. Two sub spots 51 and 53 are formed each so as to be spaced apart from a central single main spot 52 by $P_5/2$ in the track width direction and by ½ of the intermittent period of the guide grooves 54 in the track lengthwise direction. In this case, during the rotation of the disc one or the other of the sub spots 51 and 53 is always on the guide groove 54 and a tracking error signal is always produced by one or the other of the sub spots.

In FIG. 6, guide grooves 64 of an intermittent pattern are formed with a track pitch $P_6$ on a disc 60 in the like manner as in the embodiment shown in FIG. 1. Two sub spots 61 and 63 are each spaced apart from a central single main spot 62 by $P_6/4$ in the track width direction and by ¼ of the intermittent period of the guide grooves 64 in the track lengthwise direction. In this case, in the like manner as the three beam method, both of the spots 61 and 63 are utilized so that the deviation between the reflected light quantities of the two spots is detected to obtain a tracking error signal.

While the above-described embodiments show the cases in which the guide lines formed as the tracking guides are in the form of grooves, the guide lines formed in the optical recording medium according to the present invention are not limited to grooves which produce stepped structures in form so that, as an example, the invention embraces all such constructions which provide a projected light spot with an inherent optical characteristic different from that of the track surface, e.g., a line structure having an inherent magneto-optical characteristic different from that of the surroundings.

Further, while, as will be seen from the basis concept of the present invention, it is preferable to reduce the overlap length to the minimum requirement, particularly to zero for the sector regions ($B_{11}$, $B_{12}$, $B_{21}$, $B_{22}$, $B_{23}$, $B_{41}$, $B_{42}$, etc.,) where there is an overlapping between the end portions of the guide grooves adjoining each other with respect to the radial direction of the optical recording medium, the present invention is not limited thereto.

What is claimed is:

1. An optical recording medium having concentric or spiral tracks to be traced by a light spot, said optical recording medium comprising:

a plurality of concentric or spiral guide lines each thereof being arranged along one of said tracks for each circle of a plurality of circles defining a track format so as to define a track width and provide a diffracted light upon irradiation of said light spot for the purpose of tracking by said light spot, each of said guide lines having, for one of said circles, a periodic intermittent pattern in which guide line existing portions and guide line nonexistent portions appear periodically with respect to a circumferential direction in which said one of said tracks extends, a phase of said periodic intermittent pattern being shifted from that of an adjoining one of said guide lines which adjoins said one of said circles in a radial direction of said optical recording medium so as to form a first radial spacing between said guide line existing portions adjoining said one of said circles in the radial direction to define, in at least a part of a track-formed area of said optical recording medium, said track width which is less than a diffraction limit determined by a wavelength of light producing said light spot and a second radial spacing in which each of said guide line nonexistent portions is integral with an adjacent one of said tracks at sides thereof to form a wide region having a width no less than said diffraction limit.

2. An optical recording medium according to claim 1, wherein each of said guide line existing portions extends in a track lengthwise direction with a length corresponding to substantially 1/n (n being an integer and greater than 0) of a period of said intermittent pattern, wherein each of said guide line nonexistent portions extends along said track lengthwise direction with a length corresponding to substantially (n–1)/n of the period of said intermittent pattern, wherein said phase shift corresponds to substantially 1/n of the period of said intermittent pattern, wherein each of said guide line nonexistent portions forms a wide region which is integral with adjacent ones of said tracks on sides thereof, and wherein said wide region has a width dimension which is substantially over n times said track width with respect to a track width direction.

3. An optical recording medium according to claim 1, wherein each of said guide lines comprises a groove stepped with respect to the surface of said tracks.

4. An optical recording medium according to claim 1, wherein each of said guide lines has magneto-optical characteristics different from those of surface of said tracks.

5. An optical recording medium according to claim 1, wherein a circumferential length of said guide line existing portions is no less than that of said guide line nonexistent portions in each said intermittent pattern.

6. An optical recording medium according to claim 1, wherein, in mutually adjoining intermittent patterns of said guide lines, each of said guide line existing portions is formed at each end thereof with an overlapping portion in overlapping relation with that of corresponding ones of said guide line existing portions with respect to the circumferential direction.

7. A tracking apparatus for positioning at least one light spot to a selected track of a plurality of tracks of an optical recording medium during rotation thereof wherein:

said optical recording medium includes a concentric or spiral track format to be traced by said light spot, and a plurality of concentric or spiral guide lines, each of said guide lines being arranged along one of said plurality of tracks for each circle of a plurality of circles defining said track format so as to define a track width thereof and to provide a diffracted light upon irradiation of said light spot for tracking by said light spot;

each of said guide lines has, for one of said circles, a periodic intermittent pattern in which guide line existing portions and guide line nonexistent portions appear periodically with respect to a circumferential direction in which said selected track extends, a phase of said periodic intermittent pattern being shifted from that of an adjoining one of said guide lines which adjoins said one of said circles in a radial direction of said optical recording medium so as to form a first radial spacing between said guide line existing portions adjoining in the radial direction to define said track width which is less than a diffraction limit determined by a wavelength of light producing said light spot and a second radial spacing where each of said guide line nonexistent portions is integral with adjacent ones of said tracks on sides thereof to form a wide region having a width no less than said diffraction limit; and said tracking apparatus comprises a photoelectric detector for detecting a light quantity distribution with respect to a track width direction of said diffracted light, and a control unit for servo-controlling a position of said light spot in a direction of said track width in such a manner that said light quantity distribution detected by said photoelectric detector maintains its symmetry in said direction of said track width.

8. A tracking apparatus according to claim 7, wherein said at least one light spot comprises a single light spot having a spot center which is brought into alignment with a selected one of said guide lines to effect an on-groove recording or an on-groove playback.

9. A tracking apparatus according to claim 7, and further comprising means for imparting an offset amount to a tracking signal for the servo control in such a manner that a center position of said light spot is maintained at a position displaced from a selected one of said guide lines in said direction of said track width by an amount substantially corresponding to ½ of said track width.

10. A tracking apparatus according to claim 9, wherein said at least one light spot comprises a single light spot having a spot center which is brought into coincidence with a position displaced from said selected one of said guide lines in said direction of said track width to effect an on-land recording or an on-land playback.

11. A tracking apparatus according to claim 7, wherein said at least one light spot comprises three light spots arranged in an oblique direction with respect to selected ones of said tracks whereby a central one of said three light spots is a main spot for information recording or playback purposes and end light spots of said three light spots are first and second sub spots for tracking purposes, each of said first and second sub spots being spaced apart from said main spot with respect to said track width direction by a distance which is substantially less than ½ of said track width.

12. A tracking apparatus according to claim 11, wherein each of said first and second sub spots is spaced apart from said main spot with respect to said track width direction by a distance corresponding substantially to ½ of said track width, and wherein each of said first and second sub spots is apart spaced from said main spot with respect to a track lengthwise direction by a distance corresponding substantially to ½ of the period of said intermittent pattern.

13. A tracking apparatus according to claim 11, wherein each of said first and second sub spots is spaced apart from said main spot with respect to said direction of said track width by a distance corresponding substantially to ¼ of said track width, and wherein each of said first and second sub spots is spaced apart from said main spot with respect to a track lengthwise direction by a distance correspondinq substantially to ¼ of the period of said intermittent pattern.

* * * * *